US006619971B1

United States Patent
Chen (10) Patent No.: US 6,619,971 B1
(45) Date of Patent: Sep. 16, 2003

(54) EJECTING MECHANISM FOR MEMORY CARD

(75) Inventor: Po-Tsang Chen, Taipei (TW)

(73) Assignee: Speed Tech Corp., Taoyuan (TW)

( * ) Notice: Subject to any disclaimer, the term of this patent is extended or adjusted under 35 U.S.C. 154(b) by 0 days.

(21) Appl. No.: 10/159,020

(22) Filed: Jun. 3, 2002

(51) Int. Cl.⁷ .............................................. H01R 13/62
(52) U.S. Cl. ...................................................... 439/159
(58) Field of Search ................................ 439/157, 159, 439/160

(56) References Cited

U.S. PATENT DOCUMENTS

| | | | | |
|---|---|---|---|---|
| 5,466,166 A | * | 11/1995 | Law et al. .................. | 439/159 |
| 5,778,521 A | * | 7/1998 | Law et al. ..................... | 29/829 |
| 6,030,238 A | * | 2/2000 | Dong .......................... | 439/159 |
| 6,059,587 A | * | 5/2000 | Ho et al. ..................... | 439/159 |
| 6,089,889 A | * | 7/2000 | Chiou et al. ................. | 439/159 |
| 6,162,075 A | * | 12/2000 | Hara et al. .................. | 439/159 |
| 6,247,946 B1 | * | 6/2001 | Nakamura et al. .......... | 439/159 |
| 6,482,030 B1 | * | 11/2002 | Kuo ......................... | 439/541.5 |

* cited by examiner

Primary Examiner—Tulsidas Patel
(74) Attorney, Agent, or Firm—Troxell Law Office PLLC (57) ABSTRACT

Ejecting mechanism for memory card, including a seat cover, a press key seat fitted in a clamping sheath of the seat cover and a press key fitted in the press key seat. A guide channel is formed on front end of the press key. A hook is disposed on the press key seat and slidably inlaid in the guide channel, whereby the press key seat and the press key can be extended or retracted to change the length. A support arm is pivotally disposed on the seat cover, having a stop section at one end and a projecting section at the other end. The seat cover is formed with a resilient abutting plate under the projecting section. When the memory card is inserted into the terminal seat, the support arm is pushed and pivoted and the resilient abutting plate abuts against and lifts the projecting section to attach to a depressed face of the press key. When the press key is ejected, the projecting plate is resiliently lifted to engage with the front end of the press key. A middle portion of the press key seat is formed with a slope for guiding a corresponding portion of the press key. When the press key seat and the press key are relatively retracted, the front end of the press key is simultaneously pressed downward, whereby the front end of the press key can be easily engaged with the lifted projecting section. When the memory card is inserted into the terminal seat, the press key will not be ejected. When pressing the press key to eject the press key and then again pressing the press key, the support arm is pushed and pivoted to make the stop section thereof reversely push the memory card and eject the memory card out of the terminal seat.

5 Claims, 12 Drawing Sheets

EJECTING MECHANISM FOR MEMORY CARD

BACKGROUND OF THE INVENTION

The present invention is related to an ejecting mechanism for memory card. When the memory card is inserted into the terminal seat, the press key will not be ejected. The press key can be further pressed and ejected and then again pressed to eject the memory card out of the terminal seat.

A conventional ejecting mechanism for memory card includes a pivotable shift lever disposed on the memory card connector. One end of the shift lever is drivingly connected with a push bar. The other end of the shift lever is provided with a stop section for contacting with the memory card. When pushed inward, the memory card pivots the shift lever to bound the push bar outward. By means of pressing the push bar, the shift lever is pivoted to eject the memory card. Accordingly, the memory card can be inserted or ejected. However, when inserting the memory card, the push bar will be bounded outward to protrude from the memory card connector. The protruding push bar affects the appearance and obstructs the operation. Moreover, a user may mis-press the protruding push bar.

Taiwanese Patent Application No. 86212162 (U.S. Pat. No. 6030238), Taiwanese Patent Application No. 86216886 (U.S. Pat. No. 6059587) and Taiwanese Patent Application No. 88211060 (U.S. Pat. No. 6162075) disclose improved ejecting mechanisms for memory card. In these ejecting mechanisms, an extending/retracting guide mechanism is disposed in addition to the shift lever and push bar to provide a movement track for the push bar. The extending/retracting guide mechanism provides a fake pressing operation for the push bar without ejecting the memory card. Accordingly, the push bar can be retracted into the memory card connector to avoid the above problems. However, when inserting the memory card, the push bar will be still inevitably bounded out and it is necessary to press the push bar once to retract the same into the connector.

SUMMARY OF THE INVENTION

It is therefore a primary object of the present invention to provide an ejecting mechanism for memory card, including a seat cover having a clamping sheath on one side, a press key seat located in the clamping sheath of the seat cover and a press key resiliently extensibly/retractably fitted in the press key seat. A substantially heart-shaped guide channel is formed on front end of the press key. A hook is disposed on the press key seat and slidably inlaid in the guide channel, whereby the press key seat and the press key can be extended or retracted to change the length. A support arm is pivotally disposed on the seat cover, having a stop section at one end and a projecting section at the other end. The seat cover is formed with a resilient abutting plate under the projecting section. When the memory card is inserted into the terminal seat, the support arm is pushed and pivoted and the resilient abutting plate abuts against and lifts the projecting section to attach to a depressed face of the press key. When the press key is ejected, the projecting plate is resiliently lifted to engage with the front end of the press key. When the memory card is inserted into the terminal seat, the press key will not be ejected. When pressing the press key to eject the press key and then again pressing the press key, the support arm is pushed and pivoted to make the stop section thereof reversely push the memory card and eject the memory card out of the terminal seat.

It is a further object of the present invention to provide the above ejecting mechanism for memory card in which a middle portion of the press key seat is formed with a slope for guiding a corresponding portion of the press key. When the press key seat and the press key are relatively retracted, the front end of the press key is simultaneously pressed downward, whereby the front end of the press key can be easily engaged with the lifted projecting section.

The present invention can be best understood through the following description and accompanying drawings wherein:

DETAILED DESCRIPTION OF THE PREFERRED EMBODIMENT

Figure 1:
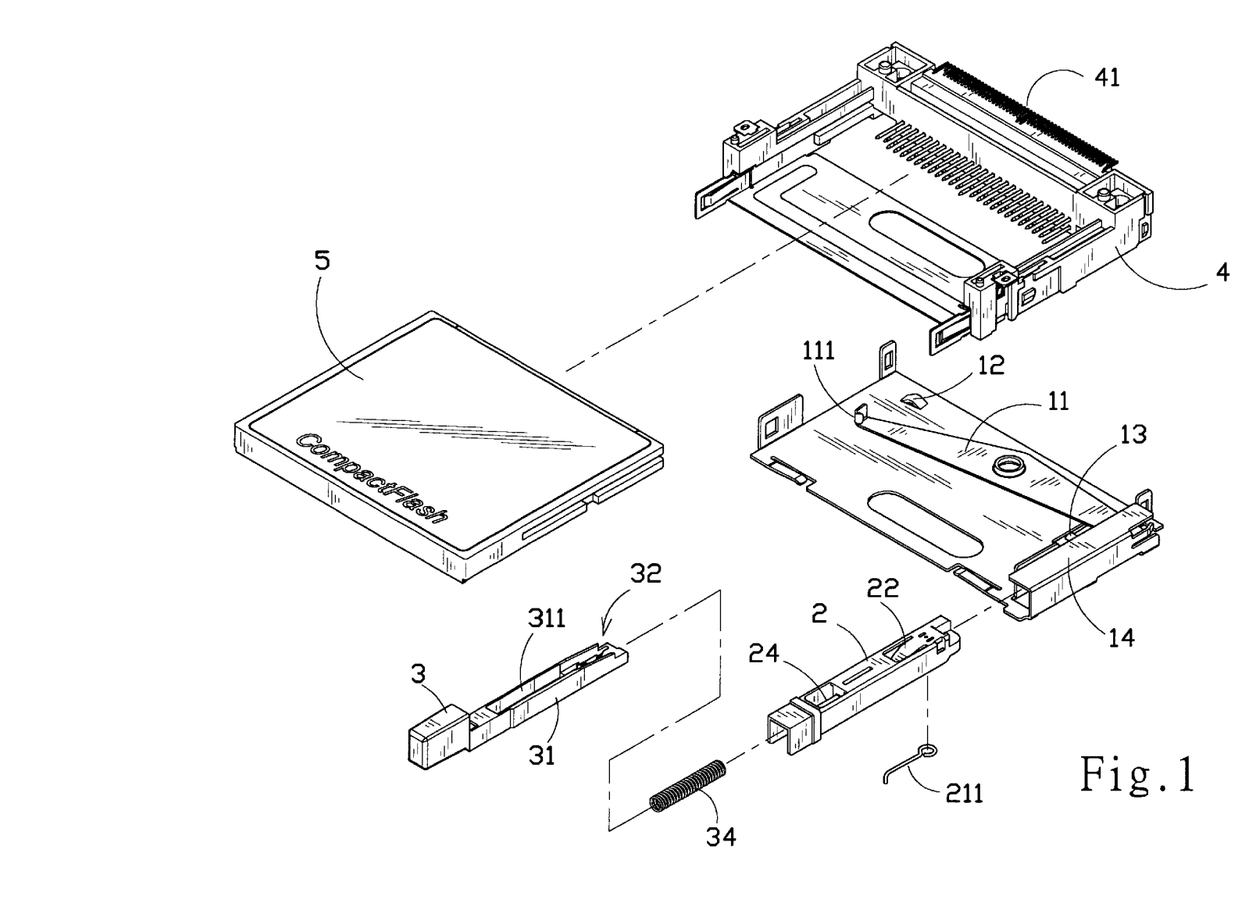
FIG. 1 is a perspective exploded view of the present invention and relevant components.
Figure 2:
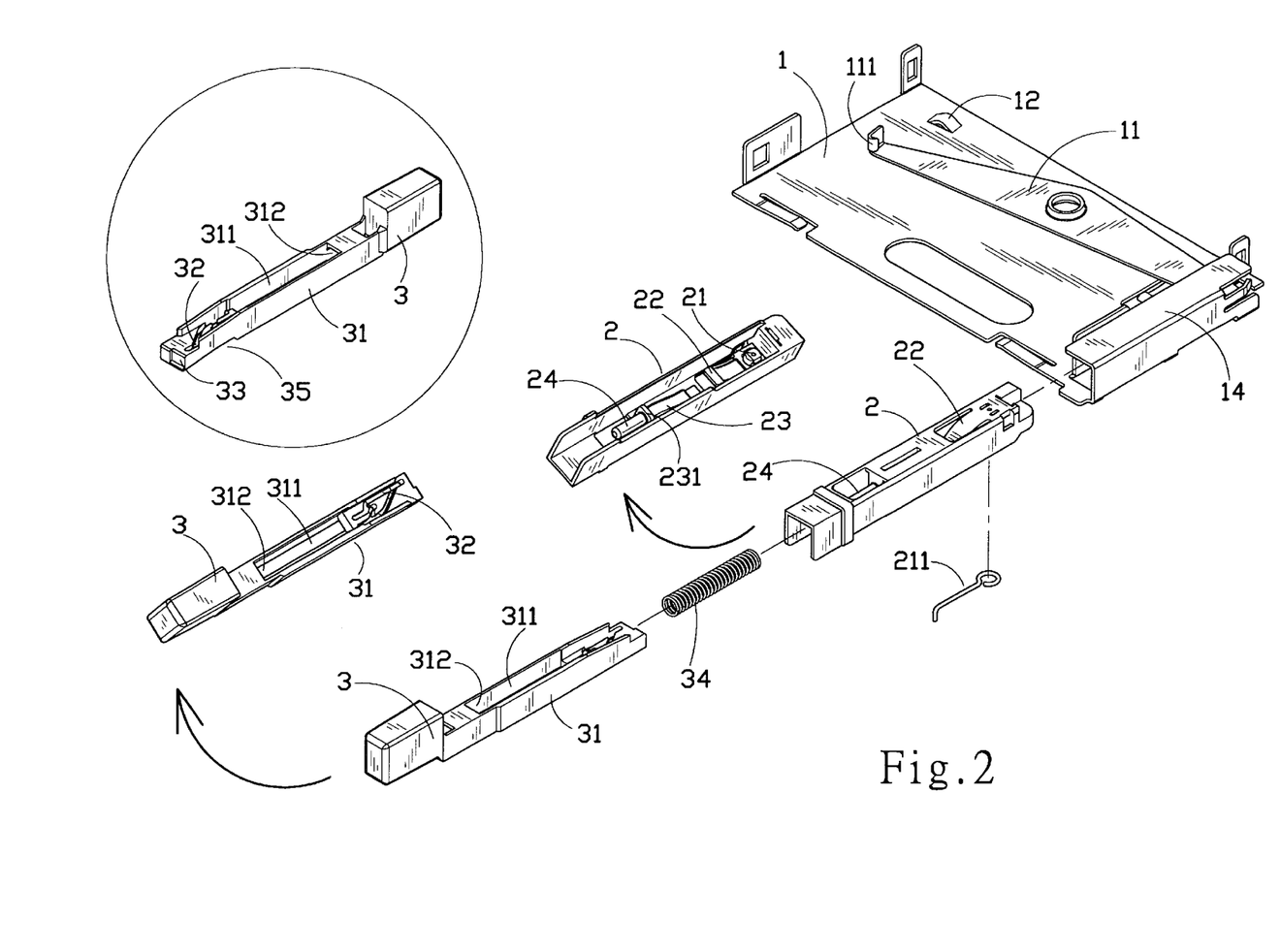
FIG. 2 is a perspective exploded view of the present invention.
Figure 6:
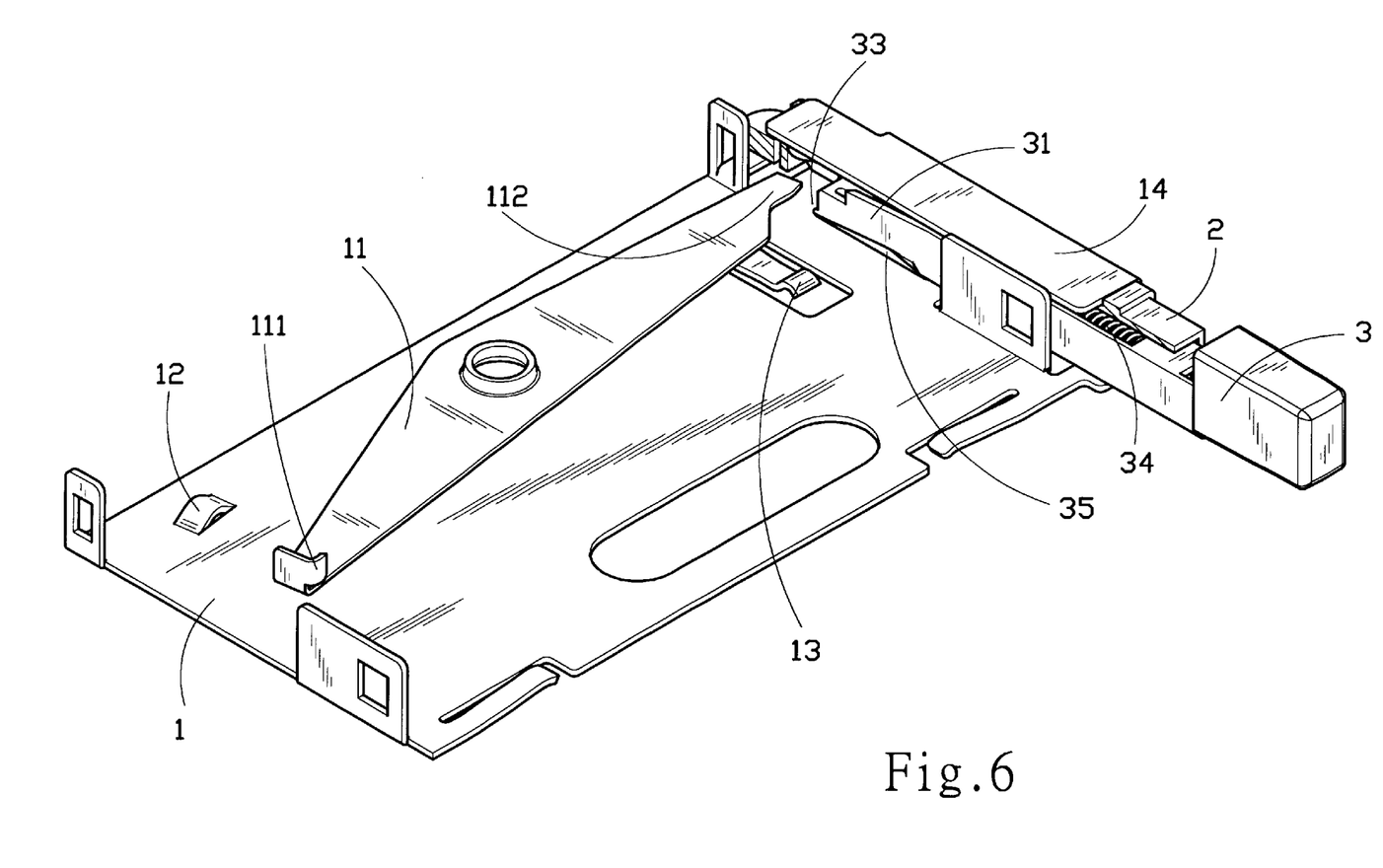
FIG. 6 is a perspective view showing the positions of the support arm and relevant components of the present invention, in which the memory card is not yet inserted.

Please refer to FIGS. 1 and 2. The present invention includes a seat cover 1, a press key seat 2 and a press key 3. A support arm 11 is pivotally disposed on a middle portion of the seat cover 1. One end of the support arm 11 is bent to form a stop section 111. the other end of the support arm 11 is formed with a projecting section 112 (as shown in FIG. 6). The seat cover 1 is formed with a protuberance 12 beside the stop section 111. The seat cover 1 is further formed with a swelling resilient abutting plate 13 beside the projecting section 112 in the pivoting path thereof. The seat cover 1 is further formed with a clamping sheath 14 on one side of the resilient abutting plate 13. The press key seat 2 is an elongated bar body with substantially reverse U-shaped cross-section. A projecting shaft 21 is disposed in one end of the press key seat 2. A hook 211 is pivotally fitted on the projecting shaft 21. A curved resilient plate 22 extends from one side of the projecting shaft 21 to a middle portion of the press key seat 2 to abut against the hook 211. A slope 23 is formed in the middle portion of the press key seat 2 and extends toward the other end thereof. An end section of the slope 23 is formed with a stop section 231 having an outward extending pin 24. A spring 34 is fitted around the pin. The press key 3 has an extension section 31 and a press section disposed at one end thereof. A middle portion of the extension section 31 is formed with a hollow section 311 passing through the extension section 31 from upper side to lower side thereof. A circularly extending guide channel 32 is formed beside the hollow section 311. The extension section 31 is further formed with a depressed face 35 on back side of the guide channel 32. In addition, the end section of the extension section 31 is formed with a recess 33. One end of the hollow section 311 adjacent to the press section (opposite to the guide channel 32) is formed with an inward extending socket 312. Multiple terminals 41 are disposed in a terminal seat 4 and extend outward. The memory card 5 is formed with multiple insertion holes. The memory card 5 can be inserted from one side of the terminal seat 4 with the terminals 41 plugged into the insertion holes of the memory card 5 to electrically connect therewith.

Figure 3:
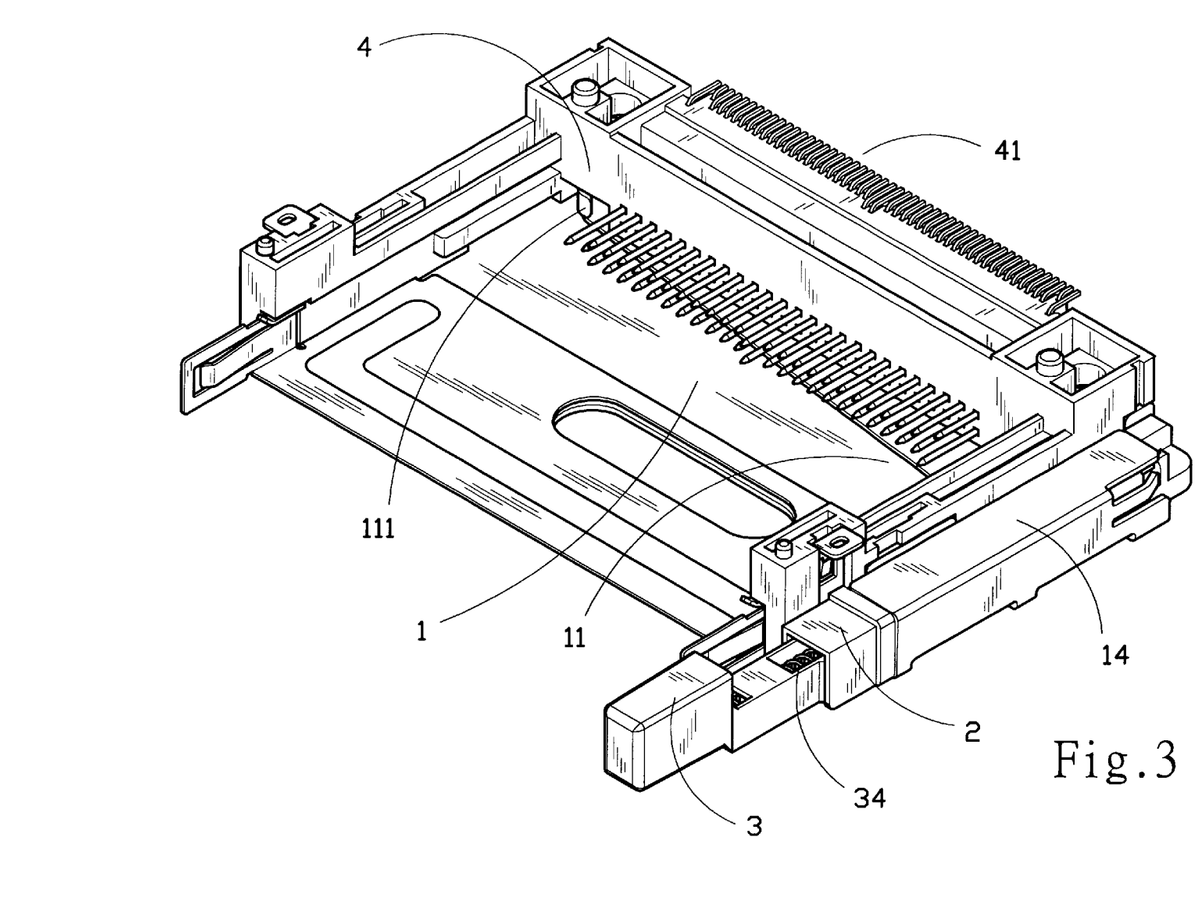
FIG. 3 is a perspective assembled view of the present invention and the terminal seat.
Figure 4:
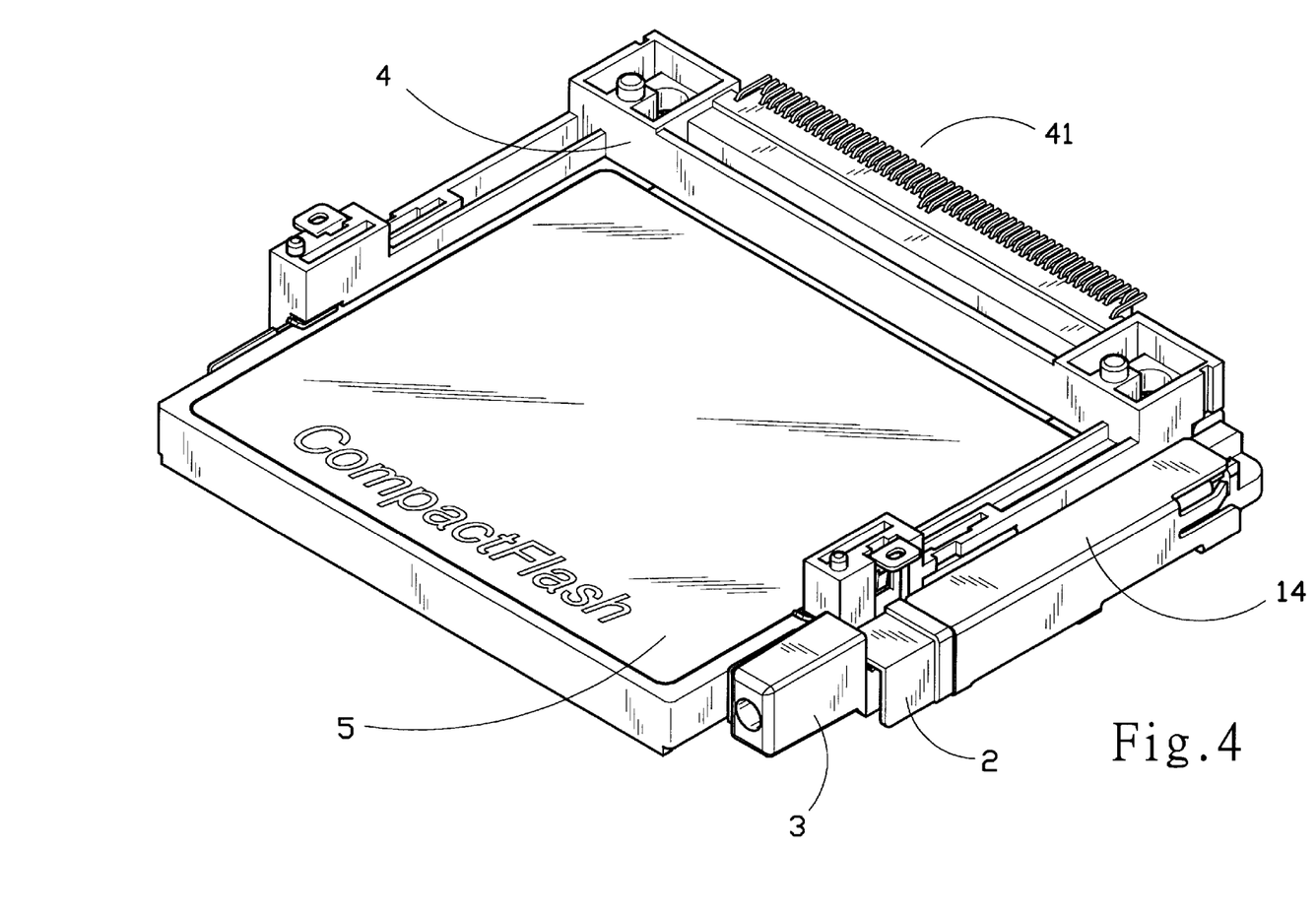
FIG. 4 is a perspective assembled view of the present invention in a using state.
Figure 5:
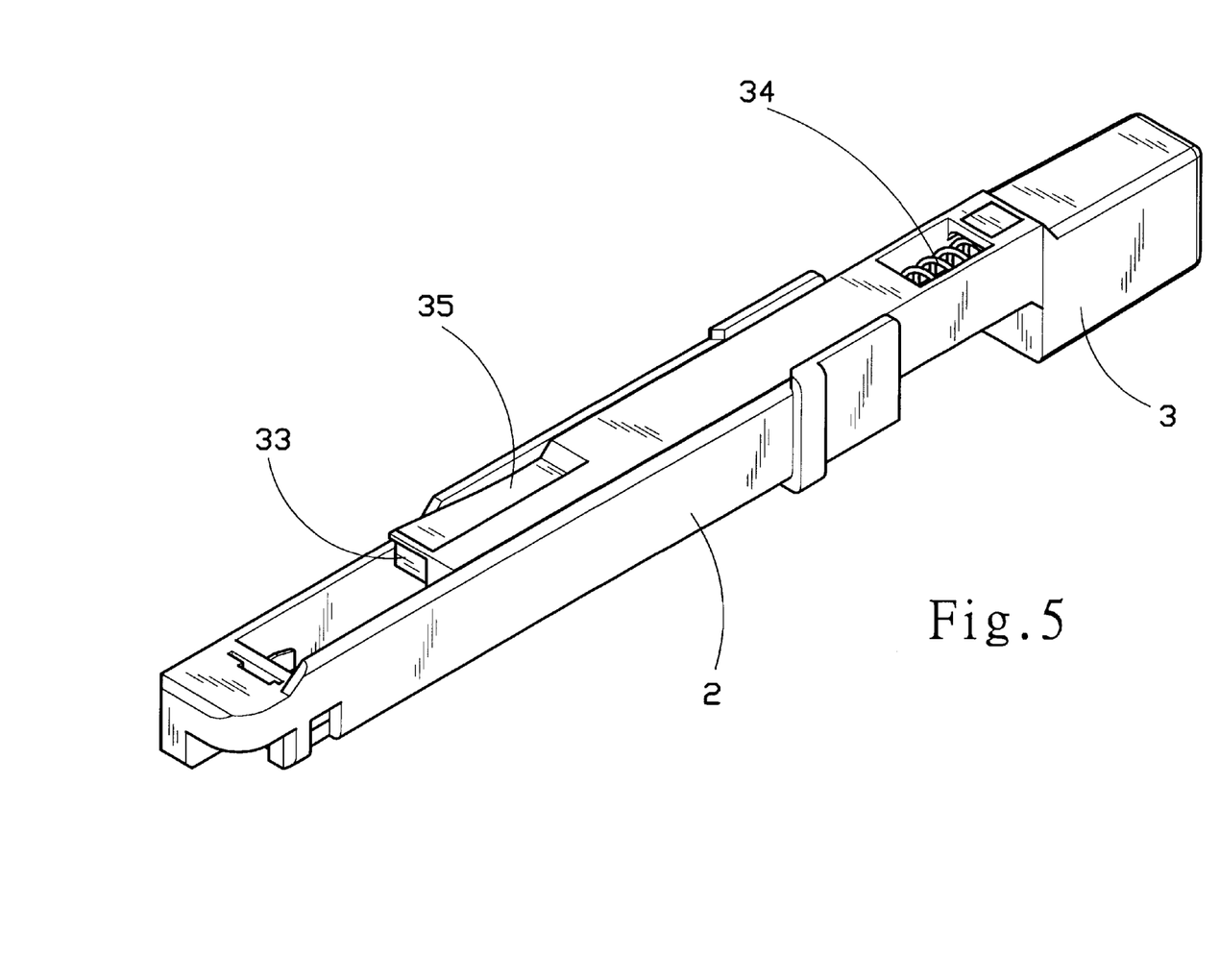
FIG. 5 is a perspective assembled view of the press key seat and the press key of the present invention.

Please refer to FIGS. 3 and 4 as well as FIG. 5. When assembled, the extension sect ion 31 of the press key 3 is fitted into the middle portion of the press key seat 2. The spring 34 fitted around the pin 24 is fitted into the socket 312 of the press key 3 to abut against the press section. Accordingly, the spring 34 is resiliently compressed between the press key seat 2 and the press key 3. The end section of the hook 211 pivoted on the projecting shaft 21 is slidably inlaid into the guide channel 32 of the press key 3. By means of the hook 211 slidable in the guide channel 32 and the cooperative spring 34, the press key seat 2 and the press key 3 can be extended or retracted to change the length. The press key seat 2 is fitted in the clamping sheath 14 of the seat cover 1 and located therein. The seat cover 1 is located on one side of the terminal seat 4 with the terminals 41 positioned in the pivoting track of the stop section 111 of the support arm 11.

Figure 7:
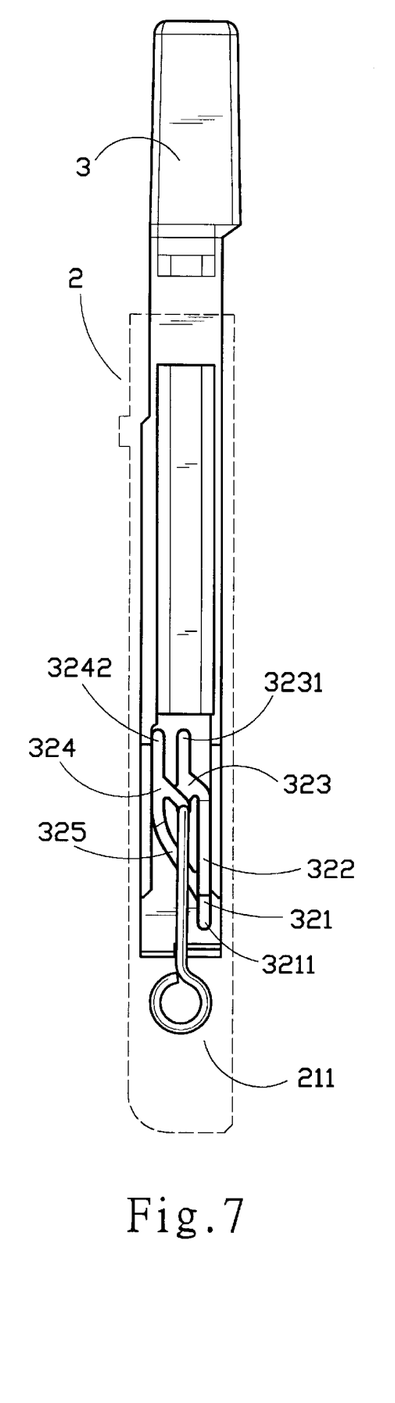
FIG. 7 is a view corresponding to the original state of FIG. 6, showing the position of the hook in the guide channel of the press key.

Please refer to FIGS. 6 and 7. The guide channel 32 of the press key 3 is substantially heart-shaped. The middle of the guide channel 32 is formed with a second dead end 3241. A high level face 323 and a low level face 324 respectively extend from the second dead end 3241 to form a V-shape. A height drop exists between the high level face 323 and the low level face 324. The low level face 324 turns and extends to a second turning point 3242. An ascending slope 325 reversely extends from the second turning point 3242 to connect with a high level face 326. The high level face 323 directly extends to a first turning point 3231. An ascending slope 322 reversely extends from the first turning point 3231 to connect with a lower level face 321. The low level face 321 extends to a first dead end 3211 where the low level face 321 and the high level face 326 are connected. A height drop exists between the high level face 326 and the low level face 321. When the memory card 5 is not yet inserted into the terminal seat 4, the press key 3 is separated from the projecting section 112 of the support arm 11 without contacting therewith. At this time, the hook 211 hooks the second dead end 3241.

Figure 8:
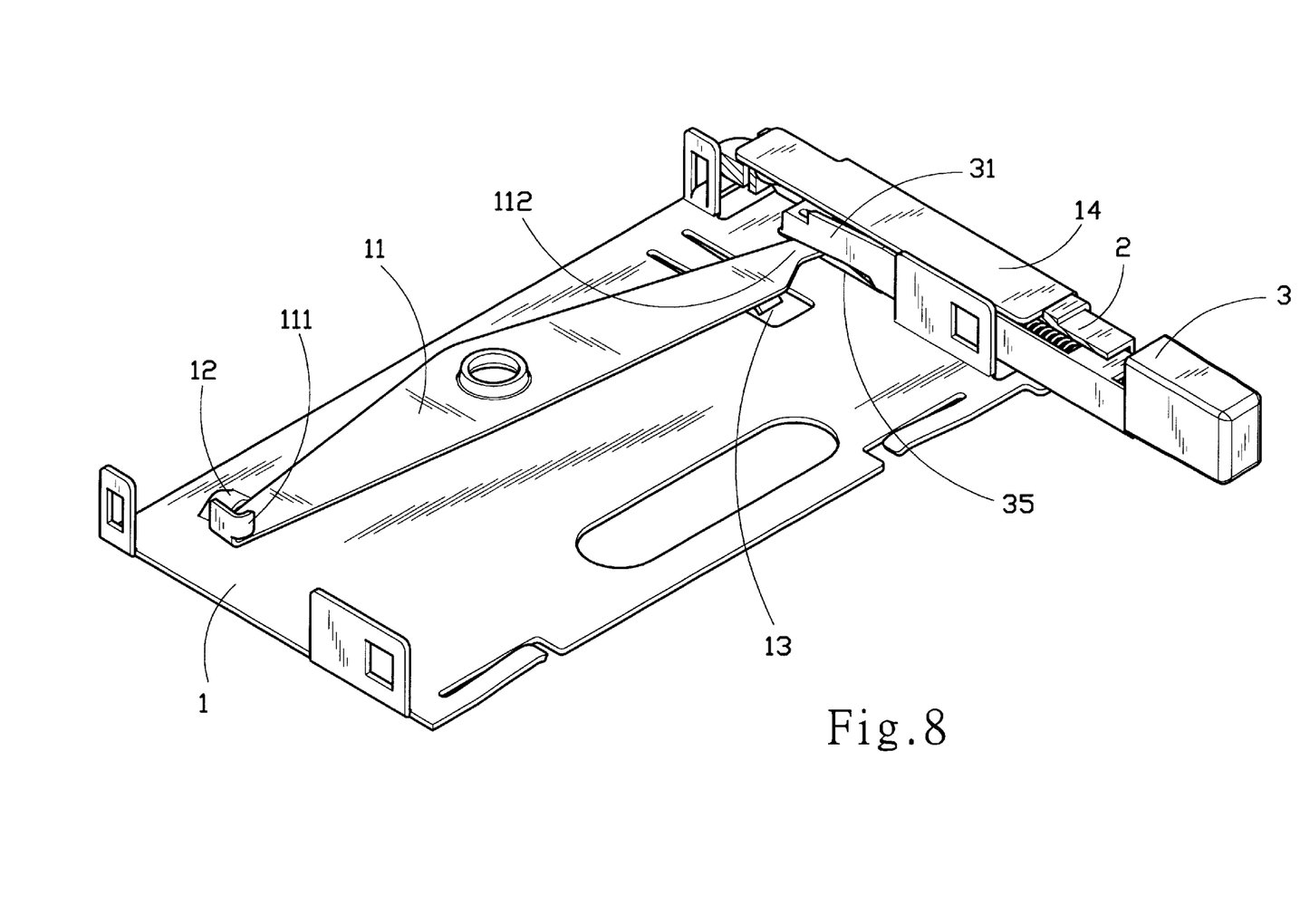
FIG. 8 is a perspective view showing the positions of the support arm and relevant components of the present invention, in which the memory card is inserted.

Referring to FIG. 8, when the memory card 5 is inserted into the terminal seat 4, the stop section 111 of the support arm 11 is pressed and the projecting section 112 at the other end is reversely moved until the resilient abutting plate 13 abuts against and lifts the projecting section 112 and makes the projecting section 112 bent to resiliently attach to the depressed face 35 of the press key 3. At this time, the position of the press key 3 is not changed and the press key 3 is not ejected.

Figure 9:
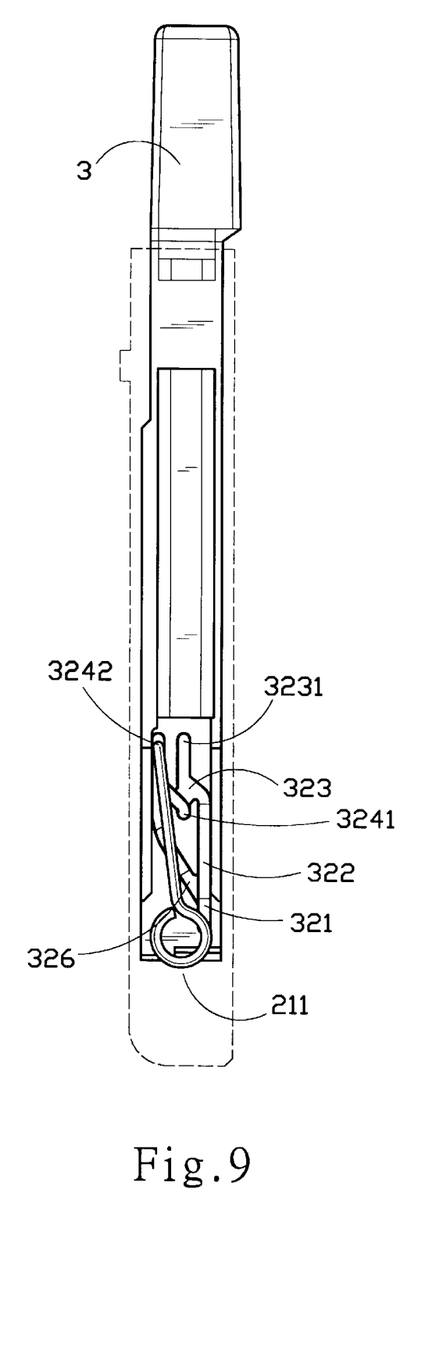
FIG. 9 shows the position of the hook in the guide channel when the press key is pressed into the press key seat.
Figure 10:
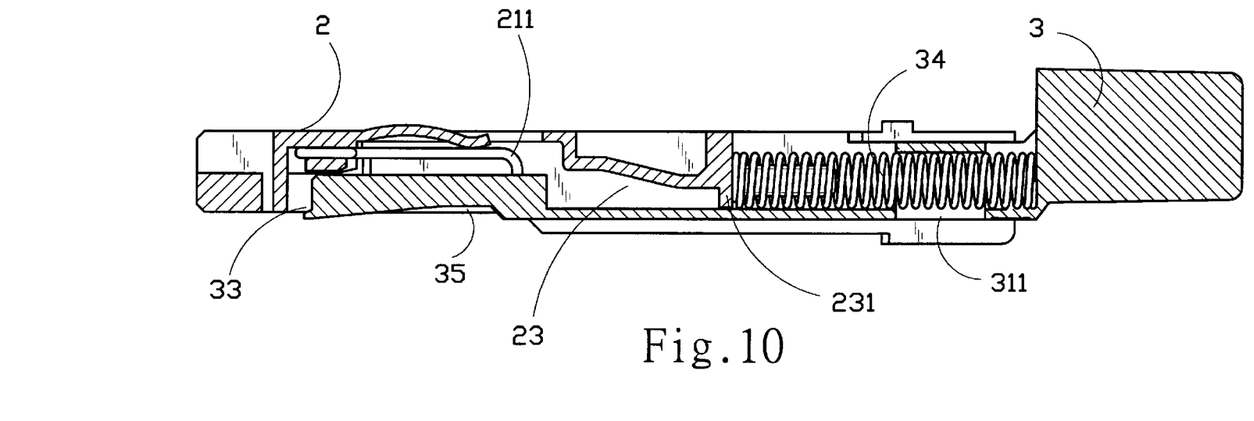
FIG. 10 is a side sectional view according to FIG. 9.

Referring to FIGS. 9 and 10, when it is desired to eject the memory card 5, a user only needs to press the press key 3, making the hook 211 slide through the low level face 324 to the second turning point 3242. (There is a height drop between the low level face 324 and the high level face 323 so that the hook 211 cannot slide to the high level face 323.) At this time, referring to FIG. 10 which shows the cross-section of the press key seat 2 and the press key 3, the press key 3 is retracted into the press key seat 2 and the projecting section 112 keeps attaching to the depressed face 35.

Figure 11:
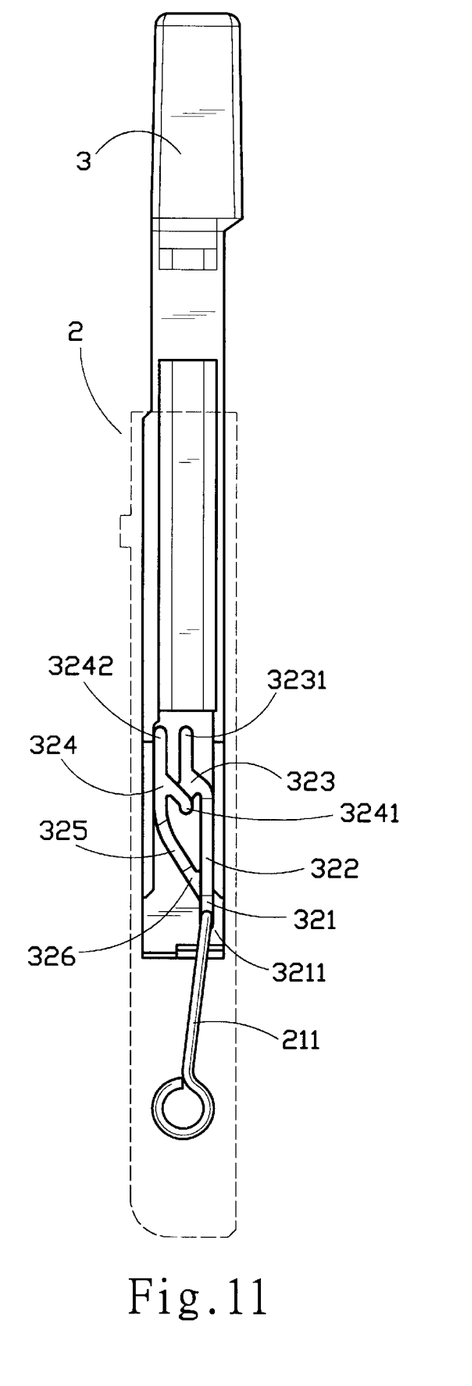
FIG. 11 shows the position of the hook in the guide channel when the press key is totally extended out of the press key seat.
Figure 12:
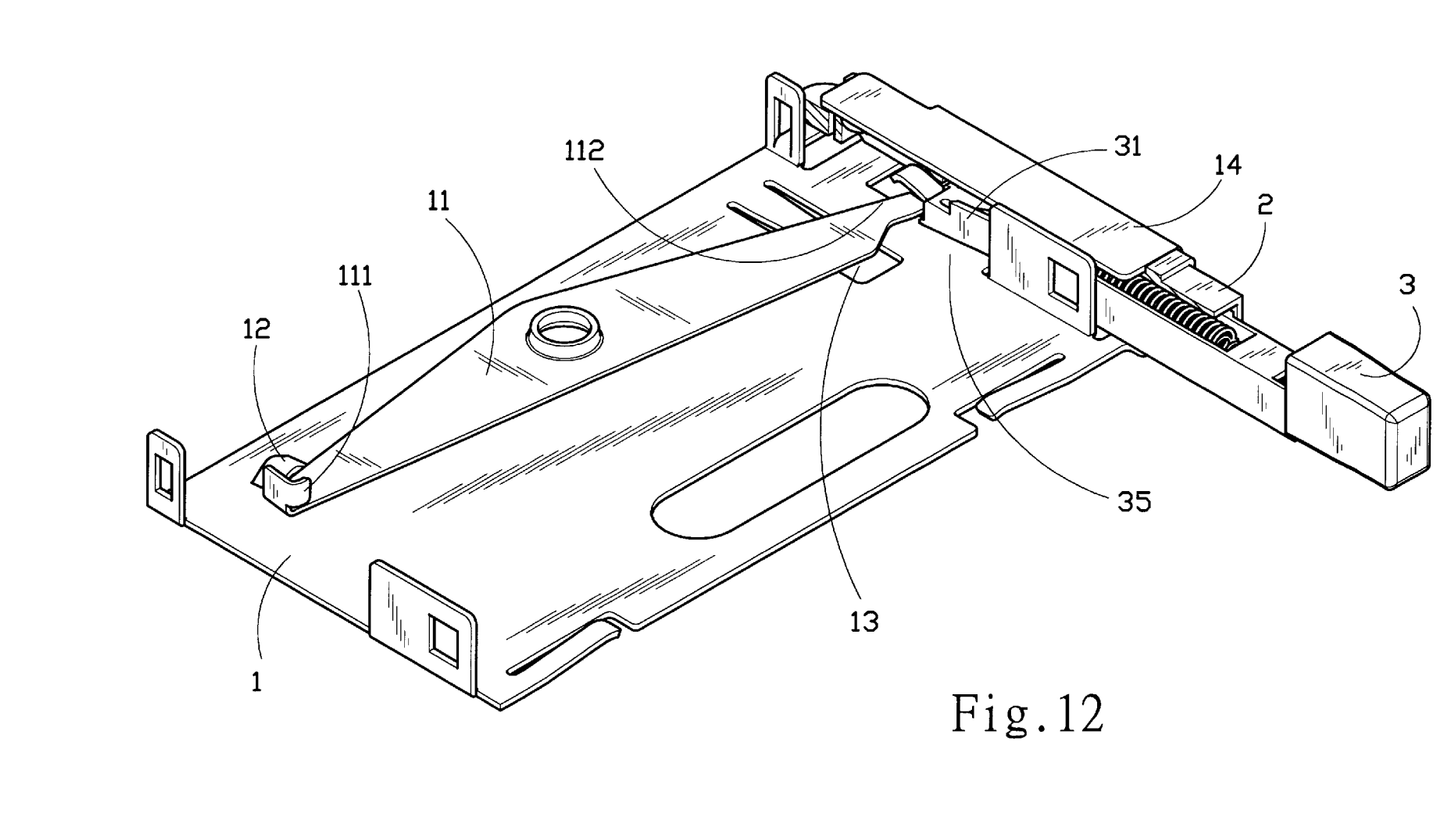
FIG. 12 is a view corresponding to FIG. 11, showing that the support arm is engaged with the recess of the press key.
Figure 13:
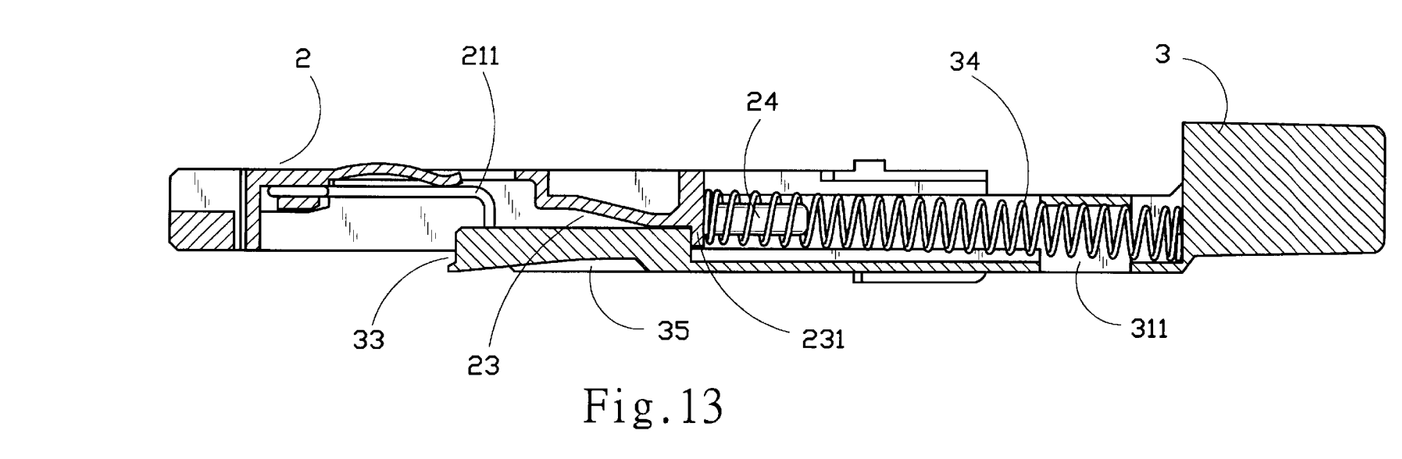
FIG. 13 is a side sectional view according to FIG. 12.

Referring to FIGS. 11, 12 and 13, when releasing the press key 3 from the pressed state of FIGS. 9 and 10, by means of the resilient force of the spring 34 compressed between the press key seat 2 and the press key 3, the hook 211 slides through the ascending slope 325 to the high level face 326 and drops from the high level face 326 to the low level face 321 and is located at the first dead end 3211 (as shown in FIG. 11). When the press key 3 outward extends from the press key seat 2, the front end face of the hollow section 311 of the press key 3 downward slides along the slope 23 (as shown in FIG. 13 ) until the depressed face 35 is separated from the projecting section 112. At this time, the resilient abutting plate 13 abuts against the support arm 11 and makes the projecting section 112 resiliently lifted in front of the recess 33 and engaged therewith (as shown in FIG. 12).

Figure 14:
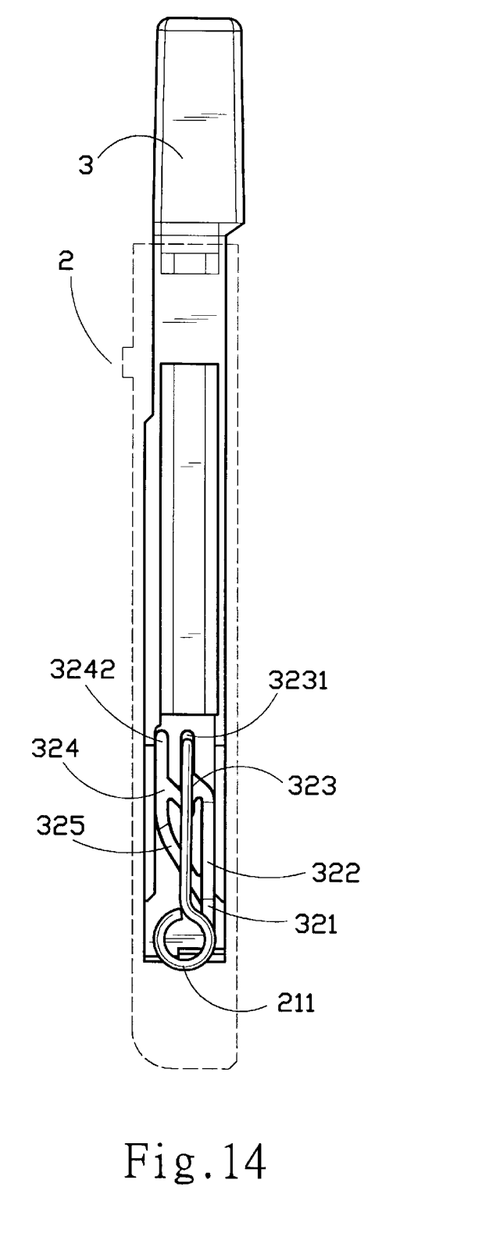
FIG. 14 shows the position of the hook in the guide channel when the press key is pressed into the press key seat to engage with support arm for ejecting the memory card.
Figure 15:
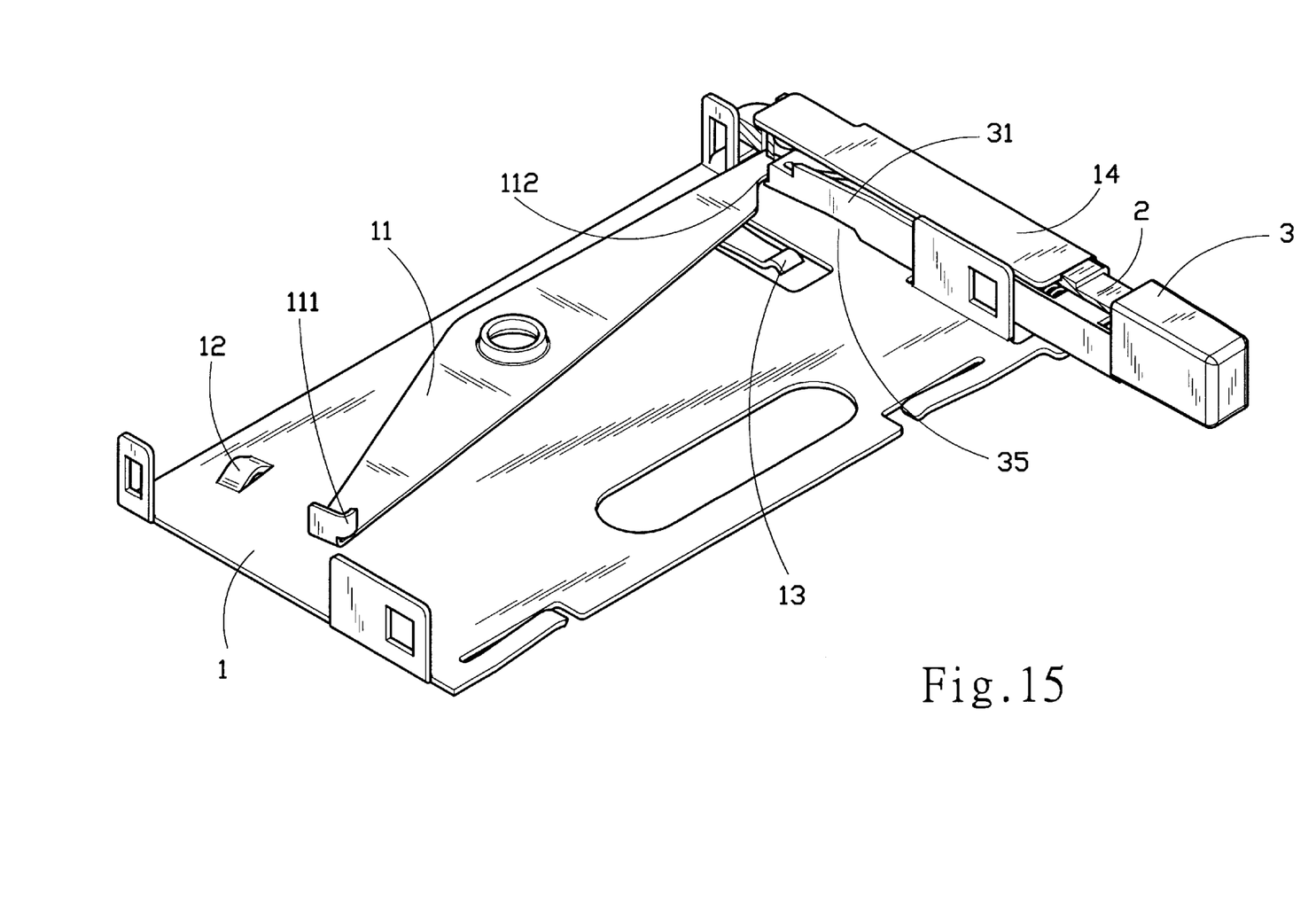
FIG. 15 is a view corresponding to FIG. 14, showing the positions of the support arm and relevant components.

Referring to FIGS. 14 and 15, after the projecting sect ion 112 of the support arm 11 is engaged with the recess 33 of the front end of the press key 3, the support arm 11 can be pushed to pivot (as shown in FIG. 15), making the stop section 111 push the memory card 5 and reversely eject the memory card 5 out of the terminal seat 4. At this time, the hook 211 slides along the ascending slope 322 to the high level face 323 and is guided to the first turning point 3231. When the memory card 5 is ejected out of the terminal seat 4 and the press key 3 is released, by means of the resilient force of the spring 34, the hook 211 directly drops from the high level face 323 to the second dead end 3241 (as shown in FIG. 7) and restores to its home position as shown in FIG. 6.

According to the above arrangement, the ejecting mechanism for memory card of the present invention has simple structure. When the memory card is inserted, the press key will not bound outward to cause inconvenience in use.

The above embodiment is only used to illustrate the present invention, not intended to limit the scope thereof. Many modifications of the above embodiment can be made without departing from the spirit of the present invention.

What is claimed is:

1. Ejecting mechanism for memory card, comprising:
a seat cover connected with one side of a terminal seat, a support arm being pivotally disposed on a middle portion of the seat cover, one end of the support arm being bent to form a stop section, whereby when the memory card is inserted into the terminal seat, the stop section is pushed by the memory card to pivot the support arm, the other end of the support arm being formed with a projecting section, the seat cover being further formed with a protuberance beside the stop section, the seat cover being further formed with a swelling resilient abutting plate beside the projecting section in the pivoting path thereof, the protuberance serving to stop the support arm from pivoting, the resilient abutting plate serving to abut against the projecting section of the support arm to bend and lift the projecting section, the seat cover being further formed with a clamping sheath on one side of the resilient abutting plate;

a press key seat which is fitted in the clamping sheath of the seat cover and connected with the seat cover, a projecting shaft being transversely disposed in one end of the press key seat, a hook being pivotally fitted on the projecting shaft, a curved resilient plate extending from one side of the projecting shaft to a middle portion of the press key seat to abut against the hook, a slope being formed in the middle portion of the press key seat and extending toward the other end thereof, an end section of the slope being formed with a stop section having an outward extending pin, a spring being fitted around the pin; and a press key having an extension section extending into the press key seat, a middle portion of the extension section being formed with a hollow section passing through the extension section from upper side to lower side thereof, the pin and the spring fitted therearound being received in the hollow section to resilient abut against the same, a guide channel being formed at an end section of the extension section beside the hollow section, whereby the hook is slidably inlaid in the guide channel to hook locating points thereof so that the press key seat and the press key can be extended or retracted to change the length, the slope of the middle portion of the press key seat serving to guide a corresponding portion of the press key, whereby when the press key seat and the press key are relatively retracted, the front end of the press key is simultaneously pressed downward so that when the memory card is inserted, the press key will not be ejected, when pressing the press key to extend the press key out of the press key seat, the front end of the press key is engaged with the projecting section of the support arm, whereby the support arm can be pushed and pivoted to make the stop section of the other end of the support arm reversely push the memory card and eject the memory card out of the terminal seat.

2. Ejecting mechanism for memory card as claimed in claim 1, wherein the guide channel of the press key is substantially heart-shaped, the middle of the guide channel being formed with a second dead end, a first high level face and a first low level face respectively extending from the second dead end to form a V-shape, a height drop existing between the first high level face and the first low level face, the low level face turning and extending to a second turning point, a first ascending slope reversely extending from the second turning point to connect with a second high level face, the first high level face directly extending to a first turning point, a second ascending slope reversely extending from the first turning point to connect with a second lower level face, the second low level face extending to a first dead end where the low level face and the high level face are connected, a height drop exists between the second high level face and the second low level face, whereby by means of the height drops of the high level faces and low level faces and the shape of the guide channel and the guiding of the ascending slopes, the hook one-way slides in the guide channel to hook the first or second dead ends so that the press key seat and the press key can be extended or retracted to change the length.

3. Ejecting mechanism for memory card as claimed in claim 1, wherein the extension section of the press key is further formed with a depressed face on back side of the guide channel, whereby when the resilient abutting plate resiliently abuts against and lift the projecting section of the support arm, the projecting section is attached to the depressed face of the press key.

4. Ejecting mechanism for memory card as claimed in claim 1, wherein the front end of the extension section is formed with a recess with which the projecting section of the support arm is engaged when the resilient abutting plate abuts against and lifts the projecting section of the support arm.

5. Ejecting mechanism for memory card as claimed in claim 1, wherein one end of the hollow section of the press key opposite to the guide channel is formed with an inward extending socket, whereby an end of the spring extends into the socket and is located therein.

* * * * *